US006110554A

United States Patent [19]

Moeller et al.

[11] Patent Number: 6,110,554

[45] Date of Patent: Aug. 29, 2000

[54] CURL FREE SILICONE COATED RELEASE LINER

[75] Inventors: Scott A. Moeller, Grand Island, N.Y.; Jay O. Baker; Stanley C. Chess, both of Goffstown, N.H.

[73] Assignee: Moore U.S.A. Inc., Grand Island, N.Y.

[21] Appl. No.: 08/813,609

[22] Filed: Mar. 10, 1997

[51] Int. Cl.[7] ........ B32B 9/00

[52] U.S. Cl. ........ 428/41.8; 283/81; 428/40.1; 428/41.3; 428/41.4; 428/42.1; 428/202; 428/352

[58] Field of Search ........ 428/40.1, 41.3, 428/41.4, 41.8, 42.1, 202, 352; 283/81

[56] References Cited

U.S. PATENT DOCUMENTS

| | | | |
|---|---|---|---|
| 3,653,944 | 4/1972 | Ehrhardt | 428/914 |
| 4,398,985 | 8/1983 | Eagon | 428/352 |
| 4,721,748 | 1/1988 | Iovine et al. | 524/460 |
| 5,023,138 | 6/1991 | McIntyre | 428/352 |
| 5,108,782 | 4/1992 | Reed | 428/447 |
| 5,397,813 | 3/1995 | Eckberg | 522/31 |
| 5,558,913 | 9/1996 | Sasaki et al. | 428/41.5 |
| 5,695,589 | 12/1997 | German | 428/40.1 |

OTHER PUBLICATIONS

"The Manufacture of Business Forms," Business Forms Glossary, International Paper Company, J.J. Forsythe, Second Edition, Apr. 1977.

Textbook description of Carbon Papers, pp. 61–73 (admitted prior art).

*Primary Examiner*—Nasser Ahmad

*Attorney, Agent, or Firm*—Nixon & Vanderhye PC

[57] ABSTRACT

A release liner for business form and label constructions comprises a substrate of carbonizing bond paper having a weight of between about 35–80 grams per square meter. A radiation (e.g. U.V.) curable silicone polymer blend is coated on the first face of the substrate with a coating weight of between about 0.8–2.3 grams per square meter. The silicone polymer blend comprises a large part base silicone polymer and optionally up to 40% of tight release additive, about 1 to 5% photoinitiator, and possibly substantially inert ingredients. A paper face of the form or label having a weight of between about 65–99 grams per square meter has a hot melt permanent or removable pressure sensitive adhesive on one of its faces, either applied directly or transferred to it if coated on the silicone, the adhesive in contact with the release liner. The form or label is substantially curl free after running through a laser printer.

20 Claims, 2 Drawing Sheets

CURL FREE SILICONE COATED RELEASE LINER

BACKGROUND AND SUMMARY OF THE INVENTION

Most silicone coated release liners, which are used with labels and business forms, have a super-calendered kraft base paper. These super-calendered sheets are very dense and prevent the silicone from soaking into the fibers before curing. The densified kraft or coated base papers curl drastically with small changes in temperature or humidity. This causes problems not only in manufacturing, but also when run through laser printers or the like at customer's installations. The calendering process also leaves a very smooth surface so that sometimes frictionizing coatings need to be applied to the liner opposite the silicone coating to aid in printer feeding when forms or labels utilizing the release liner are fed through non-impact printers, such as laser printers. The frictionizing coatings can rub off, contaminating printer parts.

While bond papers or non-densified kraft papers are known to have a more open construction more like the face sheets of the labels or business forms formed thereby, which results in less curling, it has been extremely difficult to apply a thin, smooth, continuous layer of silicone to the surface of such papers. Therefore these papers either have not been used or if used have less desirable properties than conventional release liners. One proposal for remedying this problem (see U.S. Pat. No. 5,023,138) has been to use a hot melt material having wax like properties that penetrates the porous paper substrate to provide a barrier coat so that the silicone can be provided thereover, but this increases the cost of production because it requires another step, and another coating material.

According to the present invention a release liner, a business form or label construction utilizing a release liner, and a method of producing business forms or labels using a laser printer or the like, are provided which overcome the problems set forth above. One of the key features of the present invention is to use a substrate of carbonizing bond paper for the release liner, onto which a radiation curable silicone release material is coated. Carbonizing bond paper is the paper that is a carrier for carbon in the manufacture of carbon paper. A typical range of properties of carbonizing bond paper is conventionally recognized as follows:

| | 16 lb. | 20 lb. |
|---|---|---|
| Basis Weight (17 × 22 − 500) | 15.2–16.8 | 19.0–21.0 |
| (g/m$^2$) | 57.2–63.2 | 71.4–79.1 |
| Caliper (mils) | 2.4–2.8 | 3.2–3.6 |
| Porosity, Sheffield units (2 ¼" orifice) | 5–45 | 5–45 |
| Opacity, Bausch Lomb (%) | 80–89 | 85–93 |
| Smoothness, Sheffield - FS | 110–160 | 110–160 |
| -WS | 60–110 | 60–110 |
| Brightness - FS | 75–85 | 75–85 |
| - WS | 75–85 | 75–85 |
| Ink Penetration (Hercules) - FS | 10–25 | 10–25 |
| Wax Pick - FS | 12–18 | 12–18 |
| Ash (%) | 15–18 | 15–32 |

FS - Felt Side
WS - Wire Side

Carbonizing bond, the base paper, usually is coated paper, ranging in weight from 12 lb. to 20 lb. (17×22–500). The pigments used in the base paper coating and/or on the coating serve to increase the opacity of the sheet, which minimizes the show-through of the carbon ink applied on the back of the paper. The coating tends to cover up any pinholes in the base paper so that the carbon ink does not strike through to the front of the paper, and it increases the release and receptivity of the carbon ink.

Carbonizing bond paper is distinct from conventional bond paper in that it provides more hold-out, which allows a conventional coater to apply a thin, smooth, continuous layer of silicone release material directly to a face of the carbonizing bond paper. However it does not have the same lack of permeability as super-calendered kraft base paper. Also, carbonizing bond paper has faces which are lo relatively rough, much rougher than the very smooth surfaces of calendered papers, so that there is no necessity for providing a frictionizing coating to facilitate printer feeding. The carbonizing bond paper utilized as the release liner according to the present invention preferably is lightweight, e.g. having a weight between about 35–80 grams per square meter (gsm), preferably about 45–60 gsm.

According to one aspect of the present invention a release liner for business form and label constructions having pressure sensitive adhesive is provided. The release liner comprises a substrate of carbonizing bond paper having a weight of between about 35–80 gsm (preferably about 45–60 gsm), and having first and second faces. The radiation curable silicone release material is coated directly on the first face of the substrate. That is no barrier coat is necessary, the carbonizing bond having sufficient porosity to allow some penetration of the silicone, but insufficient porosity (such as standard bond, newspaper, or like uncalendered papers have) to allow deep penetration. Therefore a thin, smooth, continuous layer of silicone release material may be coated directly on the first face.

The silicone release material preferably comprises a polymer blend having a coating weight of between about 0.8–2.3 gsm (e.g. between 1.2–1.9 gsm) applied to the first face, and the second face is bare (that is uncoated, no frictionizing coating being necessary to provide printer feeding). The coating may be a substantially continuous coating (that is over substantially the entire area to which it is applied), or it may be pattern coated. One exemplary pattern is a plurality of parallel spaced strips, which are easy to apply with conventional coaters, although spots, dots, diamond-shape, or other patterns also may be provided as long as they allow sufficient release of pressure sensitive adhesive which will contact the silicone release material.

The silicone polymer blend may comprise 30–99% base silicone polymer, 0–40% tight release additive, 0–50% easy release additive, 0–69% substantially inert ingredients, and about 1–5% photoinitiator. While both tight and easy release additives may be used, preferably only one or the other is used. For example the silicone polymer blend may comprise or consist essentially of about 85–98% base silicone polymer, about 1–10% tight or easy release additive, and about 1–5% photoinitiator; or the silicone polymer blend may consist essentially of about 95–99% base silicone polymer and 1–5% photoinitiator.

A business form or label construction (typically for use in a non-impact printer, such as a laser printer, which generates heat as part of the curing process) also is provided according to the invention. The business form or label comprises a paper face sheet (e.g. conventional bond paper) typically having a weight of between about 65–99 gsm (e.g. about 75–85 gsm) and first and second faces. In one aspect of the invention a pressure sensitive adhesive is applied to the silicone coating on the release liner. The adhesive then transfers to the second face of the face sheet when the face sheet is pressed into engagement with the adhesive layer. The adhesive transfers to the face sheet since it has greater affinity for the face sheet than the silicone coating. In another aspect of the invention a pressure sensitive adhesive coating is applied to the second face of the face sheet, e.g. a hot melt permanent or removable adhesive. The release liner comprises a substrate of carbonizing bond paper having first and second faces and a cured radiation curable silicone polymer blend coated directly on the first face of the substrate, the silicone polymer blend of the release liner engaging the pressure sensitive adhesive. The details of the carbonizing bond and the silicone material may be as set forth above.

The invention also contemplates a method of producing business forms or labels using a laser printer. The method comprises the steps of: Providing a business form or label in sheet form comprising: a paper face sheet having a weight of between about 65–99 grams per square meter, and first and second faces; a permanent or removable hot melt pressure sensitive adhesive coating said second face of said face sheet; and a release liner comprising a substrate of carbonizing bond paper having a weight between grams 35–80 grams per square meter, and having first and second faces; and a cured UV curable silicone polymer blend coated directly on said first face of said substrate or on the first face of the release liner; said silicone polymer blend of said release liner engaging said pressure sensitive adhesive. And, passing the sheet through the laser printer to print indicia on the paper face sheet first face, substantially without curl of the business form or label. The providing step may be further practiced by providing the particular silicone polymer blend as set forth above.

The release liner, and the business form or label and method utilizing the release liner, according to the present invention will thus be seen to have most of the advantages of the prior art with few of the drawbacks. The release liner according to the present invention is relatively inexpensive, does not require a barrier coat before application of the silicone release material, yet the silicone release material may be readily applied in a thin, smooth continuous layer using conventional equipment, and the release liner face opposite the silicone release material has no need for a frictionizing coating. The release liner is easy to manufacture, not being nearly as susceptible to small changes in temperature or humidity as conventional supercalendered kraft papers coated with silicone which are used as release liners, and when used in laser or like printers have much less a tendency to curl than conventional supercalendered kraft paper release liners.

It is the primary object of the present invention to provide an advantageous release liner, and products and methods utilizing the same. This and other objects of the invention will become clear from an inspection of the detailed description of the invention, and from the appended claims.

DETAILED DESCRIPTION OF THE DRAWINGS

Figure 1:
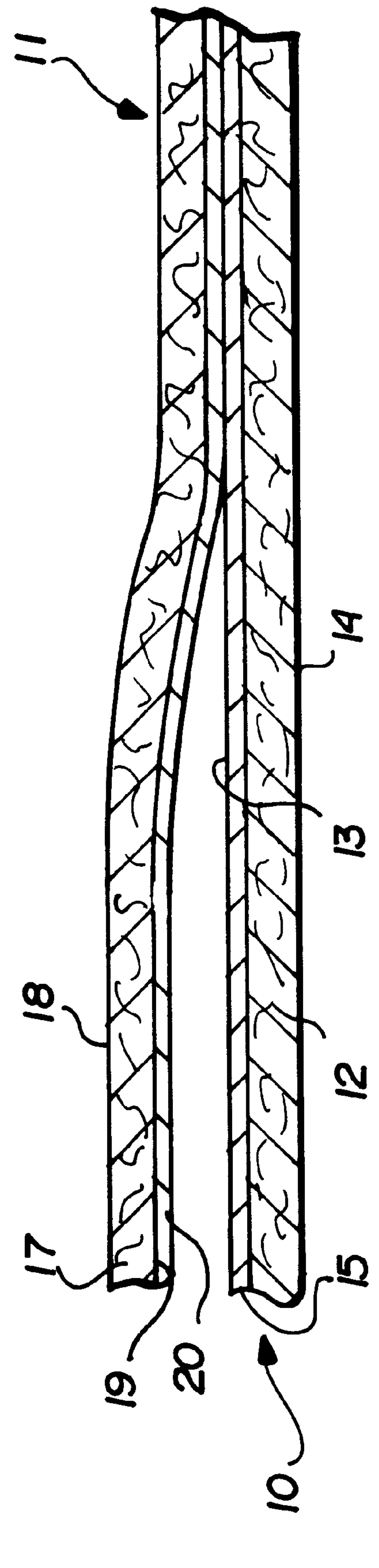
FIG. 1 is a side cross-sectional view, with the components greatly enlarged in size for clarity of illustration, of an exemplary release liner according to the present invention in the act of being detached from a form or label construction according to the invention.

FIG. 1 illustrates a release liner according to the present invention, shown generally by reference numeral 10, as part of (being detached from) an exemplary business form or label construction 11 according to the present invention. The release liner 10 comprises a substrate 12 of carbonizing bond paper preferably having a weight of between about 35–80 grams per square meter (e.g. about 45–60 gsm), and having a first face 13 and a second face 14. A radiation curable silicone release material coating 15 is provided on the first face 13. As illustrated in FIG. 1 preferably the coating 15 is directly on the face 13, with no barrier coat being necessary or desirable. The silicone release material coat 15 is thin, smooth, and uniform. Preferably the second face 14 of the substrate 12 is bare; that is it is uncoated, there being no reason to apply frictionizing coating materials thereto.

Preferably the silicone 15 is a UV curable silicone, and it has a coating weight of between about 0.8–2.3 gsm (preferably about 1.2–1.9 gsm). Preferably the silicone release material 15 comprises a silicone polymer blend comprising 30–99% base silicone polymer, 0–40% tight release additive, 0–50% easy release additive, 0–69% substantially inert ingredients, and about 1–5% photoinitiator. For example the coating 15 may consist essentially of about 85–98% base silicone polymer, about 1–10% tight or easy release additive (typically one or the other), and about 1–5% photoinitiator. Alternatively the coating 15 may consist essentially of about 95–99% base silicone polymer and about 1–5% photoinitiator.

While any suitable available components may be used for the silicone coating 15, a suitable UV curable silicone coating material is available from Goldschmidt Company, and sold under the trade names RC-711 and RC-705. A suitable U photoinitiator may be type A12, also available from Goldschmidt. An exemplary tight release additive is Goldschmidt RC-708, and an exemplary easy release additive is Goldschimidt RC726. Almost any substantially inert ingredient may be utilized if some is provided, one of many examples being SR 238, available from Sartomer Company.

The coating 15 is applied with conventional coating equipment, and may be provided continuously so that it substantially completely covers the face 13 (or those portions thereof which have a release function), or the coat 15 may be provided in a pattern configuration. While any conventional pattern configuration may be utilized, one particularly suitable is a plurality of substantially parallel spaced strips, the spacings being relatively narrow so that proper release functions of the release liner 10 are provided.

The business form or label construction 11 according to the invention which utilizes the release liner 10 includes a paper face sheet 17, preferably conventional bond paper, such as one having a weight of between about 65–99 gsm (e.g. between 75–85 gsm). The face sheet 17 has a first face 18 on which indicia is printed, and a second face 19. A pressure sensitive adhesive 20 coats the second face 19, or the silicone coating 15 coated on the first face 13 of the release liner 12. Any suitable conventional pressure sensitive adhesive can be used, such as a hot melt permanent or removable adhesive. The adhesive 20 contacts the silicone coating 15, and easy release between them is provided, as schematically illustrated in FIG. 1 which shows the face sheet 17 with attached adhesive 20 being separated from the release liner 10.

Figure 2:
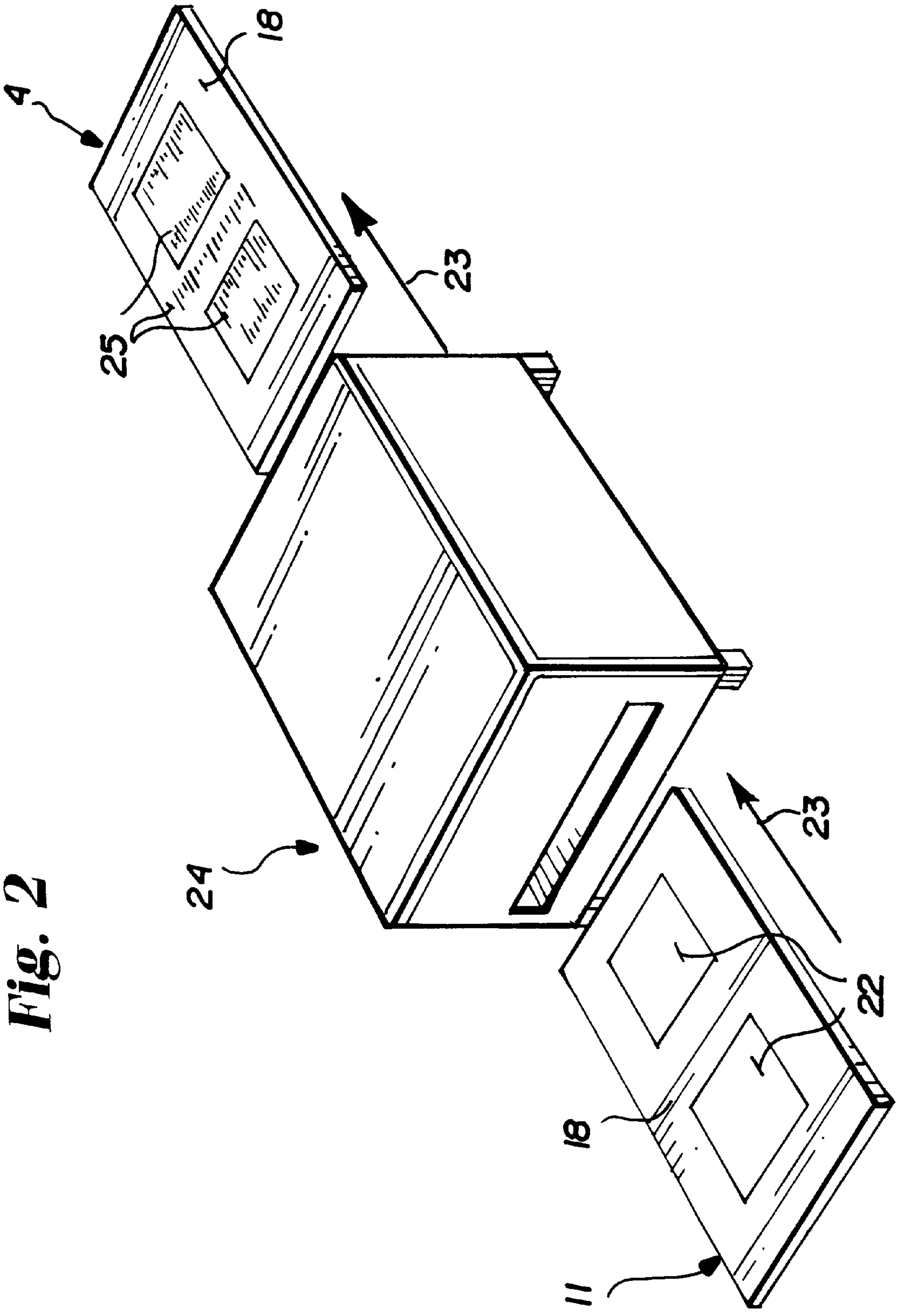
FIG. 2 is a schematic representation of the use of the business form or label construction of FIG. 1 with a laser printer to print the form or label construction.

A form or label construction 11 according to the present invention is shown schematically in sheet form in FIG. 2, in this particular construction a business form construction being provided in which a pair of labels 22 are die cut from the surrounding matrix which also comprises a business form. The construction 11 is fed, as illustrated by arrow 23, to a conventional non-impact printer which uses heat to fuse toner, such as a conventional laser printer 24. The construction 11 is printed with indicia, as indicated schematically at 25 in FIG. 2, on the first face 18 of the face sheet 17 of the construction 11. Because the release liner substrate 12 has a relatively open construction, more like the face sheet 17 than conventional calendered kraft papers, there is little or no curl of the construction 11 as or after it passes through the printer 24.

It will thus be seen that according to the present invention an advantageous business form or label construction, release liner used in that construction, and method of printing the business form or label construction with a non-curling configuration, have been provided. While the invention has been herein shown and described in what is presently conceived to be the most practical and preferred embodiment thereof it will be apparent to those of ordinary skill in the art that many modifications may be made thereof within the scope of the appended claims, which claims are to be given the broadest reasonable interpretation so as to cover all equivalent structures and methods.

What is claimed is:

1. A release liner for business form and label constructions having pressure sensitive adhesive, comprising:

a substrate of carbonizing bond paper having a weight of between about 35–80 grams per square meter, and having first and second faces; and a radiation curable silicone release material coated directly on said first face of said substrate.

2. A release liner as recited in claim 1 wherein said silicone release material comprises a silicone polymer blend having a coating weight of between about 0.8–2.3 grams per square meter applied to said first face.

3. A release liner as recited in claim 2 wherein said coating of silicone polymer comprises a substantially continuous coating, and wherein said second face is bare.

4. A release liner as recited in claim 3 wherein said silicone polymer blend comprises 30–99% base silicone polymer, 0–40% tight release additive, 0–50% easy release additive, 0–69% substantially inert ingredients, and about 1–5% photoinitiator.

5. A release liner as recited in claim 4 wherein said silicone polymer blend consists essentially of about 85–98% base silicone polymer, about 1–10% tight release additive, and 1–5% photoinitiator.

6. A release liner as recited in claim 4 wherein said silicone polymer blend consists essentially of about 85–98% base silicone polymer, about 1–10% easy release additive, and 1–5% photoinitiator.

7. A release liner as recited in claim 2 wherein said coating of silicone polymer is provided in a pattern on said first face.

8. A release liner as recited in claim 7 wherein said pattern comprises a plurality of substantially parallel spaced strips.

9. A release liner as recited in claim 7 wherein said silicone polymer blend comprises 30–99% base silicone polymer, 0–40% tight release additive, 0–50% easy release additive, 0–69% substantially inert ingredients, and 1–5% photoinitiator.

10. A release liner as recited in claim 7 wherein said silicone polymer blend consists essentially of about 85–98% base silicone polymer, about 1–10% tight or easy release additive, and 1–5% photoinitiator.

11. A release liner as recited in claim 1 wherein said silicone polymer blend consists essentially of about 95–99% base silicone polymer and 1–5% photoinitiator.

12. A business form or label construction for use in a non-impact printer which generates heat as part of a toner curing process, comprising:

a paper face sheet having a weight of between about 65–99 grams per square meter, and first and second faces;

a pressure sensitive adhesive engaging said second face of said face sheet;

a release liner comprising a substrate of carbonizing bond paper, and having first and second faces;

a cured radiation curable silicone polymer blend coated directly on said first face of said substrate; and said silicone polymer blend of said release liner engaging said pressure sensitive adhesive.

13. A business form or label construction as recited in claim 12 wherein said pressure sensitive adhesive comprises a hot melt permanent or removable adhesive.

14. A business form or label construction as recited in claim 12 wherein said carbonizing bond has a weight of between 35–80 grams per square meter.

15. A business form or label construction as recited in claim 14 wherein said silicone polymer blend has a coating weight of between about 0.8–2.3 grams per square meter applied to said first face, and said second face is bare.

16. A business form or label construction as recited in claim 13 wherein said coating of silicone polymer comprises a substantially continuous coating.

17. A business form or label construction as recited in claim 13 wherein said silicone polymer blend comprises 30–99% base UV curable silicone polymer, 0–40% tight release additive, 0–50% easy release additive, 0–69% substantially inert ingredients, and 1–5% photoinitiator.

18. A business form or label construction as recited in claim 13 wherein said silicone polymer blend consists essentially of about 85–98% base UV curable silicone polymer, about 1–10% tight or easy release additive, and 1–5% photoinitiator.

19. A business form or label construction as recited in claim 15 wherein said silicone polymer blend comprises 30–99% base UV curable silicone polymer, 0–40% tight release additive, 0–50% easy release additive, 0–69% substantially inert ingredients, and 1–5% photoinitiator.

20. A business form or label construction as recited in claim 15 wherein said silicone polymer blend consists essentially of about 85–98% base UV curable silicone polymer, about 1–10% tight or easy release additive, and 1–5% photoinitiator.

* * * * *